(12) United States Patent
Shen et al.

(10) Patent No.: US 10,588,433 B2
(45) Date of Patent: Mar. 17, 2020

(54) DATA SETTING METHOD FOR BODY INFORMATION ANALYSIS APPARATUS

(71) Applicant: CAL-COMP BIG DATA, INC., New Taipei (TW)

(72) Inventors: Shyh-Yong Shen, New Taipei (TW); Min-Chang Chi, New Taipei (TW); Ching-Sheng Tsai, New Taipei (TW); Chia-Ming Yong, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 432 days.

(21) Appl. No.: 15/700,095

(22) Filed: Sep. 9, 2017

(65) Prior Publication Data
US 2018/0352976 A1   Dec. 13, 2018

(30) Foreign Application Priority Data
Jun. 12, 2017   (CN) .......................... 2017 1 0438897

(51) Int. Cl.
| | | |
|---|---|---|
| *A47G 1/02* | (2006.01) | |
| *G06F 21/32* | (2013.01) | |
| *G06K 9/00* | (2006.01) | |
| *H04N 1/00* | (2006.01) | |
| *H04L 29/06* | (2006.01) | |
| *H04W 12/00* | (2009.01) | |
| *H04W 12/04* | (2009.01) | |
| *H04L 29/08* | (2006.01) | |
| *H04W 12/06* | (2009.01) | |
| *H04W 84/12* | (2009.01) | |

(52) U.S. Cl.
CPC ............... *A47G 1/02* (2013.01); *G06F 21/32* (2013.01); *G06K 9/00288* (2013.01); *H04L 63/102* (2013.01); *H04L 67/306* (2013.01); *H04N 1/00411* (2013.01); *H04W 12/003* (2019.01); *H04W 12/04031* (2019.01); *H04W 12/06* (2013.01); *G06F 2221/2117* (2013.01); *H04L 67/12* (2013.01); *H04W 12/00522* (2019.01); *H04W 84/12* (2013.01)

(58) Field of Classification Search
CPC .. A47G 1/02; H04N 1/00411; G06K 9/00288; G06F 21/32
See application file for complete search history.

*Primary Examiner* — Jack Dinh
(74) *Attorney, Agent, or Firm* — Chun-Ming Shih; HDLS IPR Services

(57) ABSTRACT

A data setting method adopted by a body information analysis apparatus (1) includes following steps: determining continually whether to receive a trigger audio from an electronic device (2) at the analysis apparatus (1) while it is standby or in regular use; entering an account adding mode for waiting and activating an image obtaining module (12) in the account adding mode when receiving the trigger audio; decoding a register message for obtaining user record of a user after the register message is captured by the image obtaining module (12); detecting face record of the user through the image obtaining module (12); detecting voice record of the user through an input interface (15); and, creating an account of the user of the analysis apparatus (1) based on the user record, the face record and the voice record.

14 Claims, 19 Drawing Sheets

DATA SETTING METHOD FOR BODY INFORMATION ANALYSIS APPARATUS

BACKGROUND OF THE INVENTION

1. Technical Field

The technical field relates to a body information analysis apparatus, and specifically relates to a data setting method for body information analysis apparatus.

2. Description of Related Art

Recently, due to the development of internet of things (IOT), many kinds of intellectual home appliances are disclosed, and these intellectual home appliances are able to connect to the Internet for providing diversified services to the users.

Basically, the arrangement of the physical buttons on the intellectual home appliances are restricted by the main function and the appearance of the intellectual home appliances (for example, refrigerators, TVs, mirrors, etc.). Accordingly, the current intellectual home appliances in the market usually arranged with few buttons, or only arranged with a touch screen. Therefore, users are only allowed to interact with the intellectual home appliances through the few buttons, the touch screen or through voice control.

There're parts of functions of the intellectual home appliances rely on the Internet. As known in this technical field, if an appliance needs to connect to the Internet, it usually requires the users to register an account. As mentioned above, the current intellectual home appliances do not have an appropriate input interface for the users to input a huge amount of data, so it is inconvenient for the users to perform settings to the intellectual home appliances (such as typing the name, the address, etc. for adding a new account).

SUMMARY OF THE INVENTION

The invention is directed to a data setting method for body information analysis apparatus, which may use an electronic device to assist the body information analysis apparatus completing necessary data setting actions, so as to enhance the setting efficiency.

In one of the exemplary embodiments, the method of the present application is adopted by a body information analysis apparatus and includes following steps: determining continually whether to receive a trigger audio from an electronic device at the analysis apparatus while it is standby or in regular use; entering an account adding mode for waiting and activating an image obtaining module in the account adding mode when receiving the trigger audio; decoding a register message for obtaining user record of a user after the register message is captured by the image obtaining module; detecting face record of the user through the image obtaining module; detecting voice record of the user through an input interface; and, creating an account of the user of the analysis apparatus based on the user record, the face record and the voice record.

In comparison with related art, each embodiment disclosed in the present invention may provide the user to complete data setting actions of the body information analysis apparatus through an electronic device and without doing any operation directly on the body information analysis apparatus, which is very convenient.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
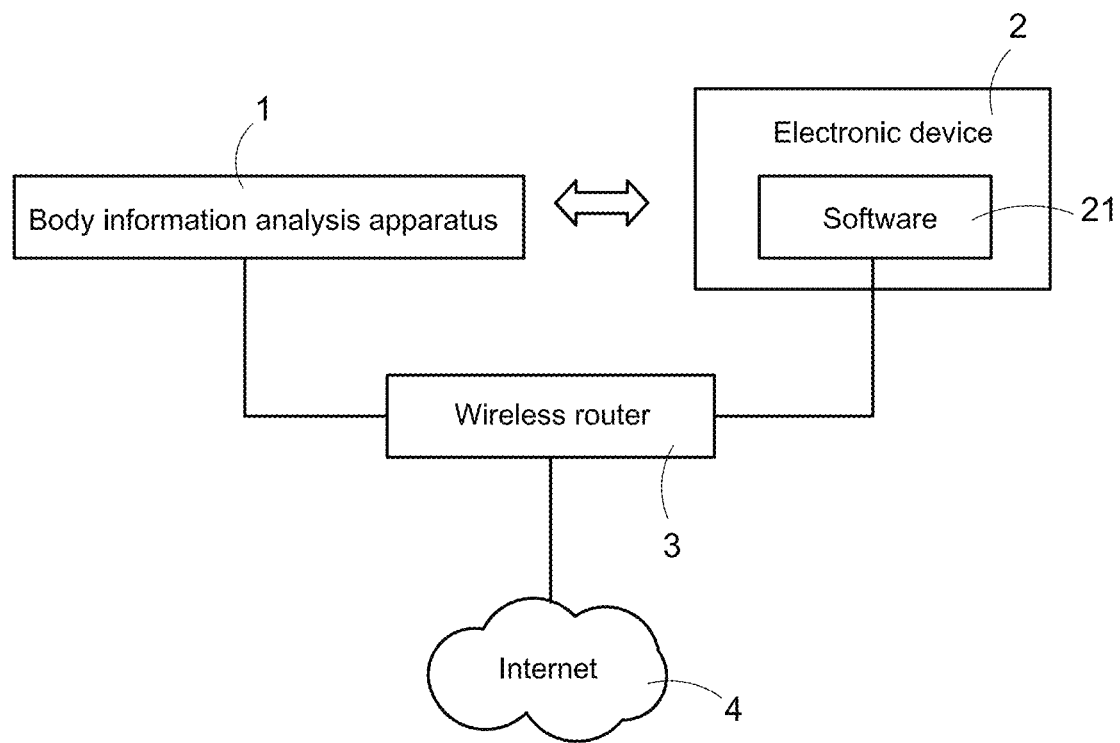
FIG. 1 is a schematic diagram of a system according to a first embodiment of the present invention.

FIG. 1 is a schematic diagram of a system according to a first embodiment of the present invention. The present invention discloses a data setting method for a body information analysis apparatus (referred to as the setting method hereinafter), and the setting method is adopted by the body information analysis apparatus 1 (referred to as the analysis apparatus 1 hereinafter) as shown in FIG. 1. The setting method is provided to assist a user in performing data setting actions to the analysis apparatus 1 (for example, to add, edit, or delete a user account of the analysis apparatus 1).

In particular, the setting method of each exemplary embodiments of the present invention allows the user to operate an electronic device 2 for completing the setting actions of the analysis apparatus 1. In one embodiment, the setting actions include an adding action for the user to create an account of the analysis apparatus 1. In another embodiment, the setting actions include a network setting action for the analysis apparatus 1 to connect with a wireless router 3 in the area for connecting to the Internet 4 through the wireless router 3. However, the above descriptions are only few embodiments of the present invention, not intended to limit the scope of the present invention.

The electronic device 2 is installed with a software 21. In particular, the software 21 may interconnect with the analysis apparatus 1 (for example, the software 21 may be an application program created and provided by the manufacturer of the analysis apparatus 1). In the present invention, a user may operate the software 21 executed by the electronic device 2 for completing the multiple setting actions of the analysis apparatus 1 (detailed described in the following)

Figure 2:
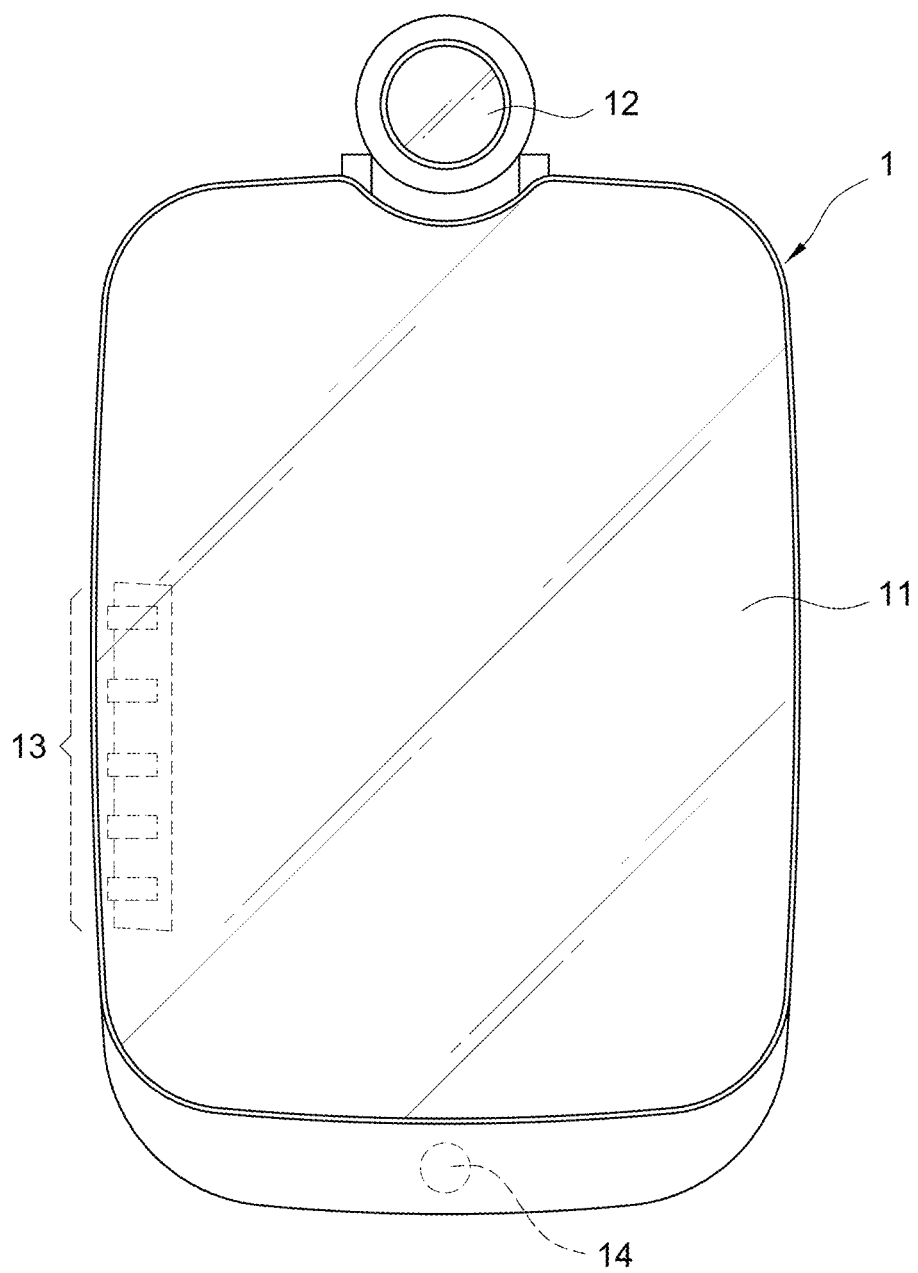
FIG. 2 is a schematic diagram of an analysis apparatus according to a first embodiment of the present invention.
Figure 3:
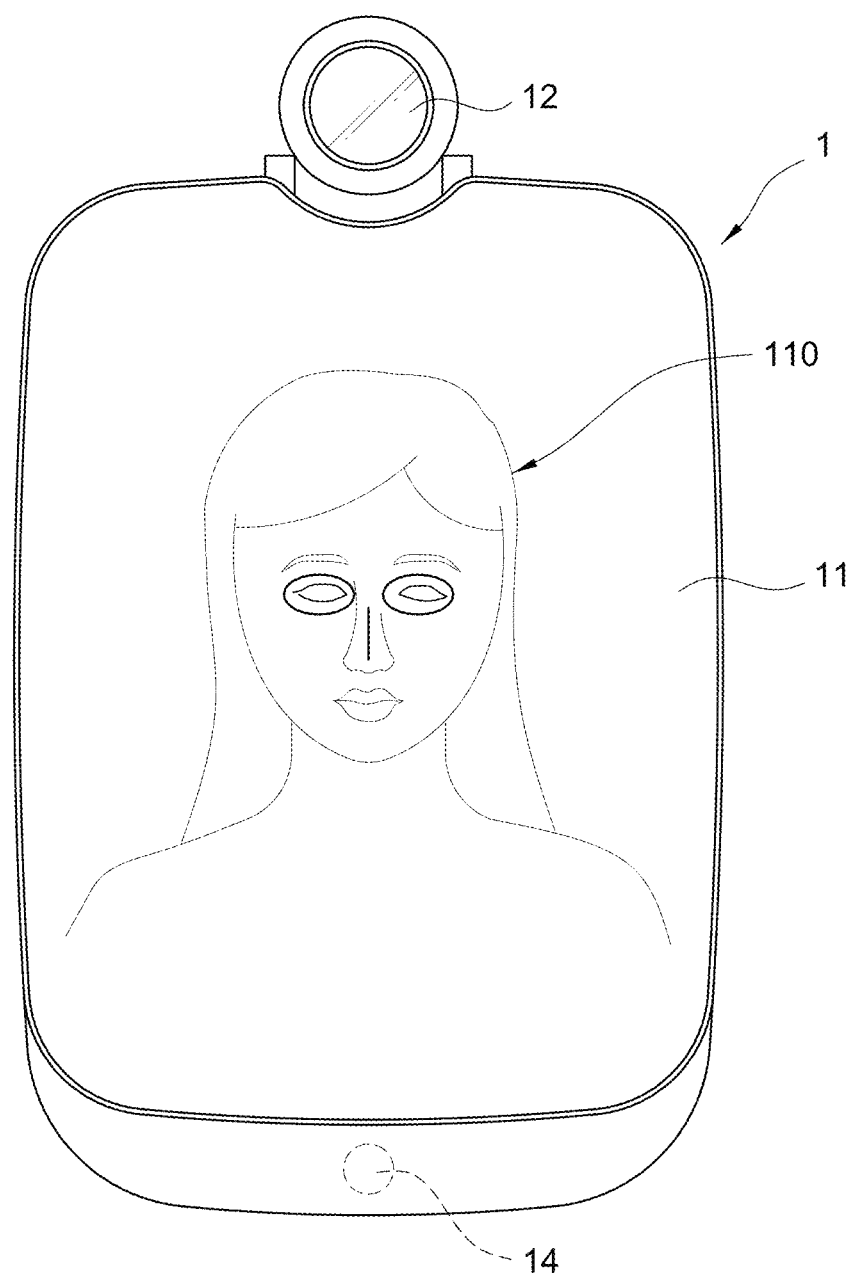
FIG. 3 is a schematic diagram of the analysis apparatus according to a second embodiment of the present invention.

Refers to FIG. 2 and FIG. 3, wherein FIG. 2 is a schematic diagram of an analysis apparatus according to a first embodiment of the present invention, and FIG. 3 is a schematic diagram of the analysis apparatus according to a second embodiment of the present invention. The analysis apparatus 1 in the present invention is basically arranged in the bedroom or the restroom and is used to detect and analyze user's body information (such as the skin situation of the face, the neck, the hands, etc. of the user).

The analysis apparatus 1 includes a mirror screen 11. The analysis apparatus 1 displays a graphical user interface (GUI) 110 through the mirror screen 11 for interacting with the user while it is turned on. On the other hand, when the analysis apparatus 1 is turned off, the mirror screen 11 can be deemed and used as a regular mirror. In one embodiment, the mirror screen 11 may be a touch screen, and the user may perform data input on the analysis apparatus 1 through the mirror screen 11.

The analysis apparatus 1 further includes an image obtaining module 12, which is arranged on the analysis apparatus 1 and is adjustable for its setting angle. In one embodiment, the image obtaining module 12 may capture high-resolution images for the user (such as face images, neck images, hands images, etc.). Therefore, the analysis apparatus 1 may analyze user's body information through the captured images. In another embodiment, the image obtaining module 12 may capture external messages (such as barcodes, QR codes, etc.), and the analysis apparatus 1 may obtain necessary data according to the content of the captured external messages for performing above mentioned setting actions (detailed described in the following).

The analysis apparatus 1 further includes multiple buttons 13. In one embodiment, the multiple buttons 13 may be physical buttons or touch keys, not limited thereto. The user may operate the GUI 110 (for example, controls the GUI 110 to go back to a home page, perform a pageup function, perform a pagedown function, etc.), or leads the analysis apparatus 1 to quick trigger corresponding functions (for example, turns on the mirror screen 11, turns off the mirror screen 11, turns on the image obtaining module 12, etc.), by way of pressing the buttons 13.

The analysis apparatus 1 further includes one or more sensors 14 (such as temperature sensors, humility sensors, etc.). The sensors 14 are used to detect the environment around the position of the analysis apparatus 1, and then the accuracy of the user's body information detected and analyzed by the analysis apparatus 1 may be enhanced in accordance with the sensor data. In one embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user may perform data input on the analysis apparatus 1 through the moving gestures without physically touching the aforementioned mirror screen 11 or the buttons 13, so as prevent the mirror screen 11 and the buttons 13 from retaining fingerprints.

Figure 4:
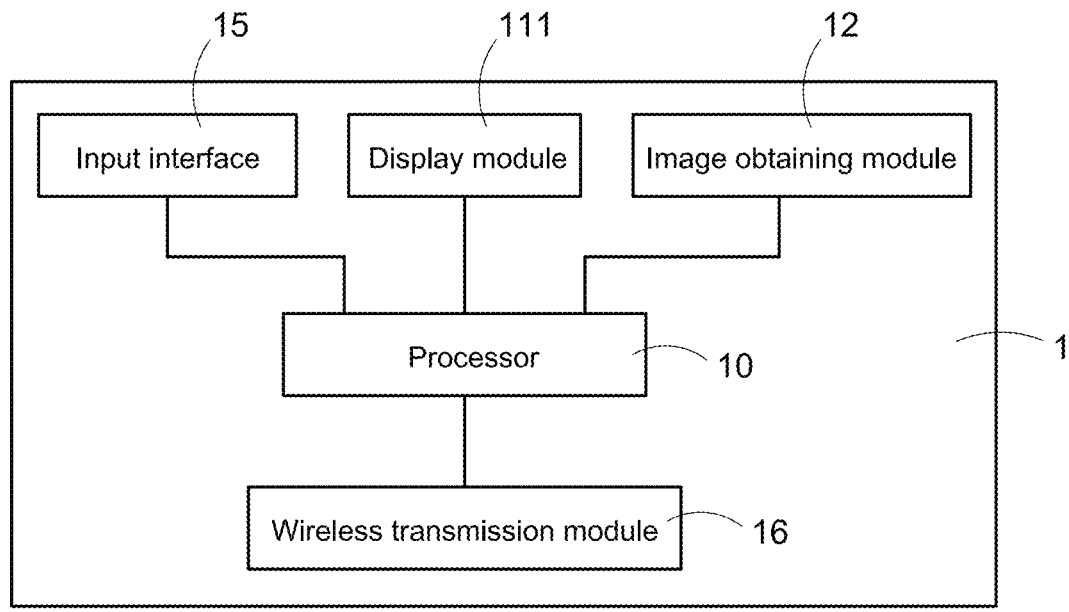
FIG. 4 is a block diagram of the analysis apparatus according to a third embodiment of the present invention.

FIG. 4 is a block diagram of the analysis apparatus according to a third embodiment of the present invention. As shown in FIG. 4, the analysis apparatus 1 mainly includes a processor 10, a display module 111, the image obtaining module 12, an input interface 15, and a wireless transmission module 16, wherein the display module 111, the image obtaining module 12, the input interface 15, and the wireless transmission module 16 are electrically connected with the processor 10.

In one embodiment, the image obtaining module 12 may be a camera. The image obtaining module 12 is used to capture external images and messages and provides the captured images and the captured messages to the analysis apparatus 1. The analysis apparatus 1 may analyze the user's body information through the captured images, and may perform relative setting actions through the content of the captured messages.

The display module 111 is used to display the aforementioned GUI 110. In one embodiment, the display module 111 is arranged inside the mirror screen 11. When the display module 111 is turned on, the light emitted from the display module 111 may penetrate through the mirror screen 11 and the user may see the display module 111 inside the mirror screen 11 directly by his/her bare eye. When the display module 111 is turned off, the user may regard and use the mirror screen 11 as a regular mirror.

The analysis apparatus 1 may receive external input through the input interface 15. The analysis apparatus 1 may interact with the GUI 110, or may perform relative setting actions according to the input. In one embodiment, the input interface 15 may be the aforementioned sensors 14, so as to detect the gesture inputs from the user. In another embodiment, the input interface 15 may be the image obtaining module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio and controls the analysis apparatus 1 entering a corresponding mode (detailed described in the following).

The wireless transmission module 16 assists the analysis apparatus 1 to connect to the Internet. In particular, after the user finishes network settings of the analysis apparatus 1 via using the electronic device 2, the analysis apparatus 1 may connect to the wireless router 3 as the same as the electronic device 2 through the wireless transmission module 16, and the analysis apparatus 1 may then connect to the Internet 4 through the wireless router 3. In one embodiment, the analysis apparatus 1 may connect with the electronic device 2 wirelessly through the wireless router 3 after connecting successfully to the wireless router 3. In another embodiment, the analysis apparatus 1 may pair or connect with the electronic device 2 directly through other transmission protocols (for example, Bluetooth pairing, Zigbee connecting, RF connecting, etc.), so as to transmit data, instructions and signal to each other.

The processor 10 is connected to the display module 111, the image obtaining module 12, the input interface 15, and the wireless transmission module 16, and the processor 10 may include computer executable program codes. Upon executing the computer executable program codes, the processor 10 may control all the above mentioned modules of the analysis apparatus 1.

Figure 5:
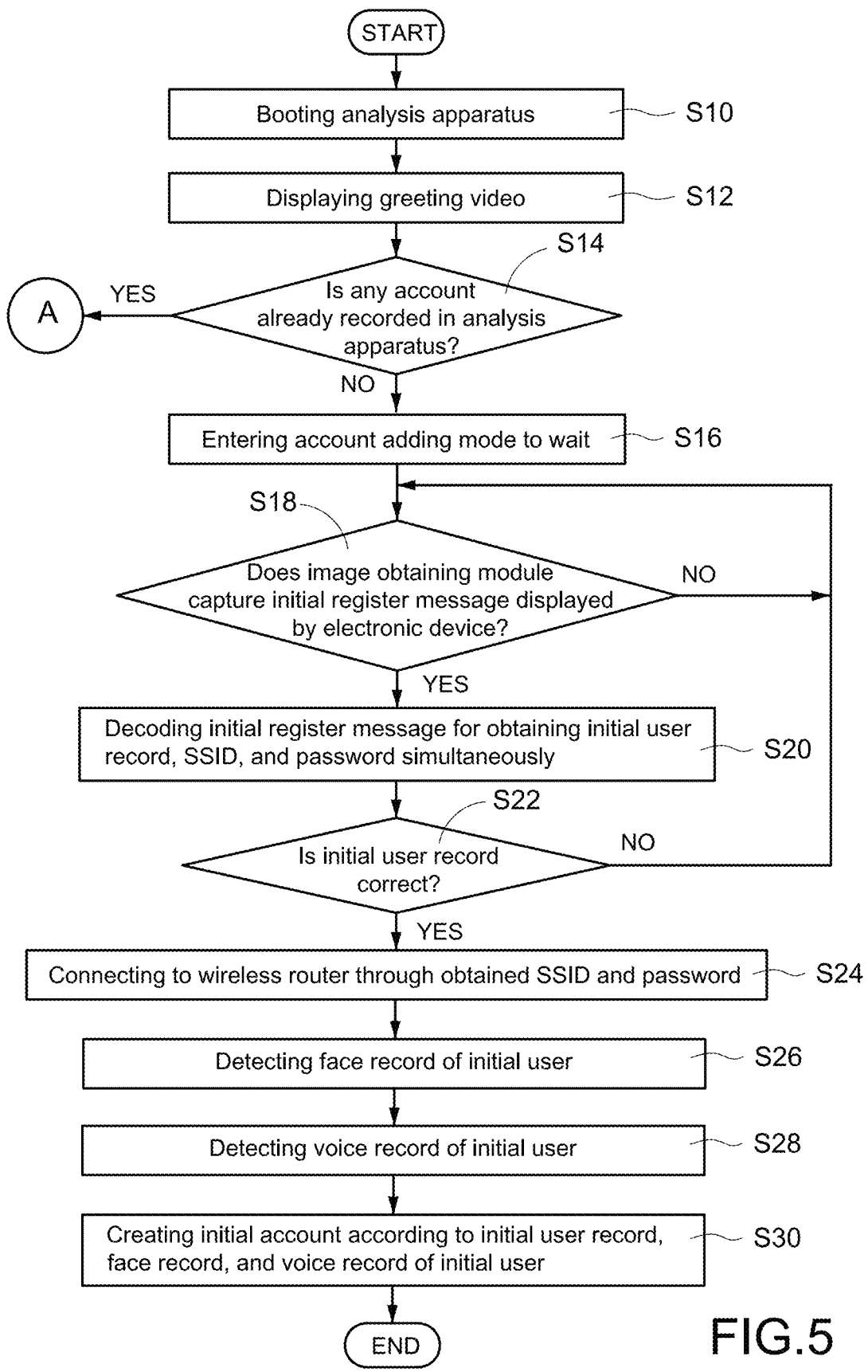
FIG. 5 is a first setting flowchart according to a first embodiment of the present invention.

FIG. 5 is a first setting flowchart according to a first embodiment of the present invention. FIG. 5 discloses each step of the aforementioned setting method of the present invention. As mentioned, the processor 10 of the analysis apparatus 1 stores the computer executable program codes. After the analysis apparatus 1 is turned on and the processor 10 executes the computer executable program codes, the analysis apparatus 1 may interact with the electronic device 2 (especially the software 21 ran in the electronic device 2), so as to implement each step shown in FIG. 5.

First, the analysis apparatus 1 receives an external operation for booting (step S10), and selectively displays a greeting video on the mirror screen 11 (step S12) after booting, so as to welcome the user to use the analysis apparatus 1, or/and indicates the usage instructions to the user.

For the sake of analyzing body information of different users, the analysis apparatus 1 needs to create different accounts for different users at the beginning. Therefore, the analysis apparatus 1 is capable of identifying, analyzing, and recording body information of different users respectively.

Figure 6:
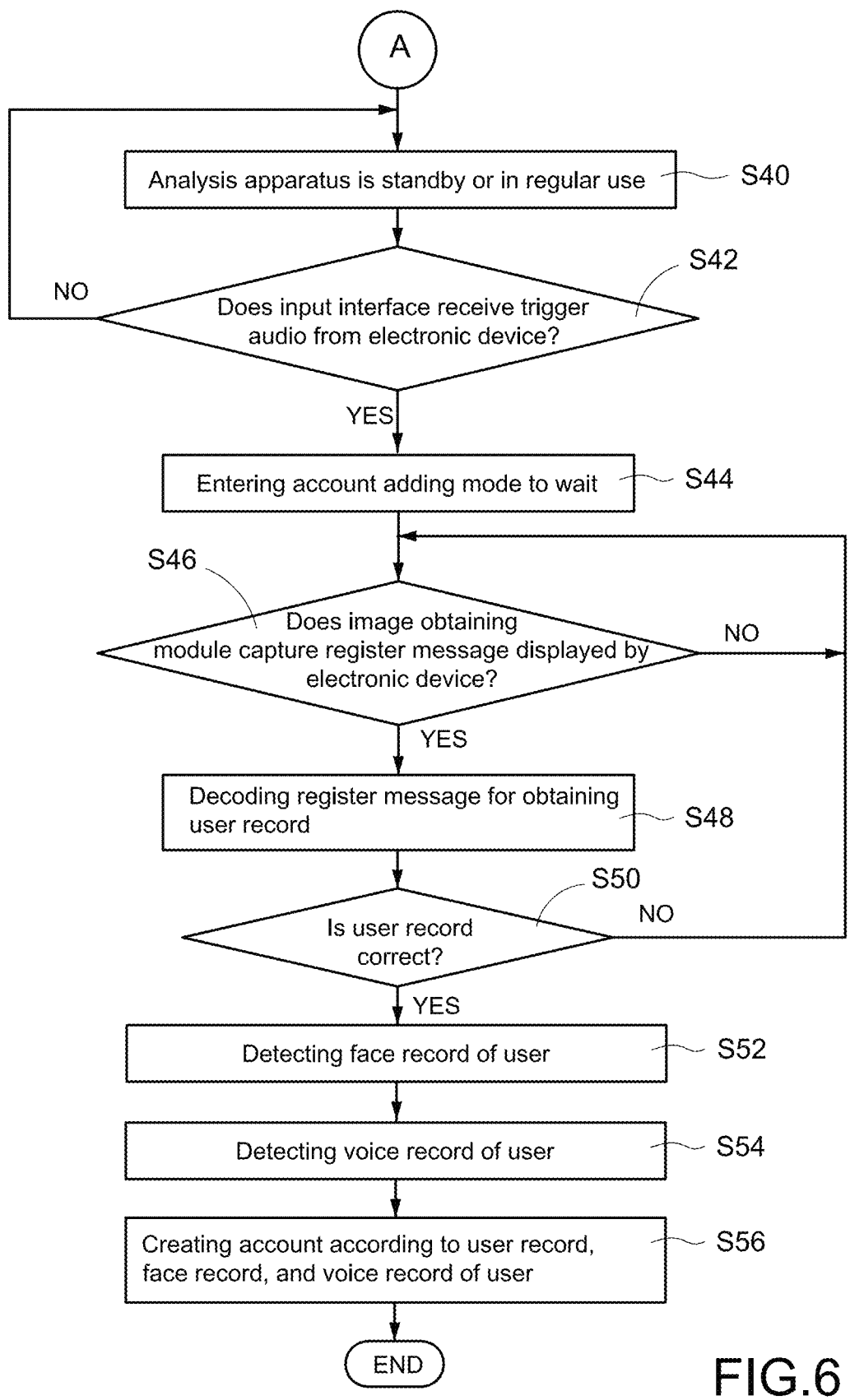
FIG. 6 is a second setting flowchart according to the first embodiment of the present invention.

In the embodiment, the analysis apparatus 1 is asked to record at least one account to perform following analyzing actions to the user corresponding to the recorded account. As shown in FIG. 5, after being turned on, the analysis apparatus 1 determines whether at least one account is already recorded therein (step S14). If no account is recorded, the analysis apparatus 1 proceeds to execute an adding procedure for an initial account (i.e., executes step S16 to step S30 as shown in FIG. 5). Otherwise, if at least one account is recorded, the analysis apparatus 1 may allow the owner of the account to use the analysis apparatus 1. Also, another user may trigger the analysis apparatus 1 to execute the adding procedure for another account as well (i.e., executes each step as shown in FIG. 6), so as to create another account for another user.

If no account is recorded, the analysis apparatus 1 enters an account adding mode and keeps waiting therein (step S16). In the account adding mode, the analysis apparatus 1 activates the image obtaining module 12 to continually scan externally for capturing external messages. Therefore, the analysis apparatus 1 may executes the aforementioned adding procedure for creating the initial account and performs another relative setting actions according the content of the captured external messages (depending on the content of the captured external messages).

In one embodiment, the analysis apparatus 1 determines, in the account adding mode, whether the image obtaining module 12 captures an initial register message displayed by the electronic device 2 (step S18). In particular, when an initial user (i.e., the first user of the analysis apparatus 1) needs to create an account of the analysis apparatus 1, he or she may operate the electronic device 2, uses the software 21 of the electronic device 2 to generate the initial register message based on the setting actions the initial user wants to execute on the analysis apparatus 1. Next, the electronic device 2 displays the generated initial register message through a monitor thereon for being captured by the image obtaining module 12 of the analysis apparatus 1.

In one embodiment, the aforementioned initial register message may be a barcode or a QR code, but not limited thereto. In another embodiment, the aforementioned initial register message may be texts or images. After capturing the texts or the images through the image obtaining module 12, the analysis apparatus 1 may perform optical character recognition (ORC) algorithm or image recognition algorithm on the texts or the images for obtaining the text contents or the image contents of the initial register message.

In this embodiment, the analysis apparatus 1 interacts with the electronic device 2 via capturing the messages displayed by the electronic device 2 through the image obtaining module 12. In another embodiment, the analysis apparatus 1 may interact with the electronic device 2 by way of pairing or connecting wirelessly through multiple types of transmission protocols like Bluetooth, Zigbee, Radio Frequency, etc. (for example, transmitting the aforementioned initial register message wirelessly). For the sake of interpretation, an example that the analysis apparatus 1 uses the image obtaining module 12 to capture the initial register message displayed on the monitor of the electronic device 2 is taken in the following.

If the analysis apparatus 1 determines, in the account adding mode, the image obtaining module 12 does not capture any message, it goes back to step S18 for keeping capturing. If the analysis apparatus 1 determines, in the account adding module, the image obtaining module 12 does capture the initial register message, the analysis apparatus 1 decodes the captured initial register message, so as to obtain necessary data for executing following procedures from the decoded initial register message.

In one embodiment, the initial register message may include initial user record of the initial user. After decoding the initial register message, the analysis apparatus 1 may obtain the initial user record and creates a new account for the initial user thereon according to the initial user record.

It should be mentioned that the initial register message is generated by the software 21 of the electronic device 2, and the initial user record in one embodiment may be the account data used by the initial user for registering the account of the software 21. In the other words, if the electronic device 2 is installed with the software 21 and the initial user uses his/her own account to login into the software 21 when operating the electronic device 2, then the software 21 may directly generates the initial register message for the initial user according to the account data of the initial user.

In another embodiment, the analysis apparatus 1 is new for usage, or is not connected to the Internet yet. In this embodiment, the aforementioned initial register message may not only include the above initial user record, but also the service set ID (SSID) and the password used by the wireless router 3 connected with the electronic device 2. Therefore, after capturing and decoding the initial register message, the analysis apparatus 1 may obtain the aforementioned initial user record, the SSID, and the password simultaneously (step S20).

After step S20, the analysis apparatus 1 may selectively display the initial user record on the mirror screen 11 for user confirmation (step S22). If the user determines that the initial user record is incorrect (for example, the user may use the electronic device 2 or the input interface 15 of the analysis apparatus 1 to confirm the correctness of the displayed initial user record), the analysis apparatus 1 may go back to step S18 and captures another initial register message through the image obtaining module 12.

If the user determines that the initial user record is correct, the analysis apparatus 1 connects to the wireless router 3 as the same as the electronic device 2 through the obtained SSID and password (step S24). At least one exemplary embodiments of the present invention allows the user to implement setting actions of the analysis apparatus 1 through operating the electronic device 2, thus the electronic device 2 must locate near the analysis apparatus 1. If the electronic device 2 may successfully connect with the wireless router 3, the analysis apparatus 1 must locate within the signal transmission range of the wireless router 3. Therefore, using the above approach of the embodiment to perform network settings of the analysis apparatus 1 may simplify the setting procedures and eventually enhance the setting efficiency.

For being easily used by the user and enhancing the security of the user, when creating the account of the initial user, the analysis apparatus 1 may not only record the aforementioned initial user record, but also a face record and a voice record of the initial user. Therefore, the initial user is allowed to activate the analysis apparatus 1 through the face recognition or to operate the analysis apparatus 1 through the voice commands after his/her account is created and included the face record and the voice record.

After step S24, the analysis apparatus 1 detects the face record of the initial user through the image obtaining module 12 (step S26), and further detects the voice record of the initial user through the input interface 15 (such as the microphone) (step S28). Finally, the analysis apparatus 1 executes the adding action for the initial account of the analysis apparatus 1 according to the initial user record, the face record, and the voice record of the initial user (step S30), so as to create the initial account for the initial user. After step S30, the initial user owns the first one and the only one account of the analysis apparatus 1 (which is the initial account), thus the initial user may use the analysis apparatus 1 to detect, analyze, and record his/her body information by using the initial account.

FIG. 6 is a second setting flowchart according to the first embodiment of the present invention. FIG. 6 discloses further steps of the setting method of the present invention. After the analysis apparatus 1 is tuned on and the processor 10 executes the computer executable program codes, and the analysis apparatus 1 determines that at least one account (for example, the above initial account) is already recorded therein, the analysis apparatus 1 then performs each step as shown in FIG. 6.

If the analysis apparatus 1 records at least one account (such as the initial account), it may stay in the standby mode or be used regularly by the user after being turned on (step S40), it is unnecessary for the analysis apparatus 1 to directly enter the account adding mode after being turned on. In this embodiment, the analysis apparatus 1 may keep detecting external voices through the input interface 15 after being activated, and determines whether the input interface 15 receives a trigger audio emitted from the electronic device 2 (step S42). The analysis apparatus 1 may enter the account adding mode and waits therein automatically when the input interface 15 is determined receiving the trigger audio emitted from the electronic device 2 (step S44).

In particular, the account adding mode is only used for adding new accounts, it is uneconomic to arrange exclusive buttons 13 on the analysis apparatus 1 just for the account adding mode. Besides, the analysis apparatus 1 in the present invention allows the user to operate therewith through voice commands, but the user may not frequently have account-creating demand and it is easy to forget the corresponding voice command for triggering the account adding mode.

For preventing the above problem from occuring, the user needs to control the electronic device 2 to emit the trigger audio through its speaker (not shown), and the analysis apparatus 1 may automatically enter the account adding mode after receiving the trigger audio emitted from the electronic device 2.

Similar to step S18 of FIG. 5, the analysis apparatus 1 determines, in the account adding mode, whether the image obtaining module 12 captures a register message displayed by the electronic device 2 (step S46). In this embodiment, the register message is generated by the electronic device 2 according to another user record of another user (i.e., a user different from the initial user) of the electronic device 2.

In particular, the user record is the account data used by the user for registering an account of the software 21 of the electronic device 2. In one embodiment, the register message may be a barcode or a QR code, and is displayed on the monitor of the electronic device 2 for being captured by the image obtaining module 12 of the analysis apparatus 1.

If the analysis apparatus 1 determines that the image obtaining module 12 does not capture any message yet, it goes back to step S46 for keeping capturing external messages. If the analysis apparatus 1 determines that the image obtaining module 12 does capture the register message, it decodes the captured register message for obtaining the user record from the decoded register message (step S48). It should be mentioned that the analysis apparatus 1 might be completed the network settings in step S24 of FIG. 5, so the register message discussed in this embodiment is unnecessary to include connection information of the wireless router 3 (such as the SSID and the password). However, in another embodiment, the software 21 may obtain another data depending on the setting actions the user wants to execute on the analysis apparatus, and generates the register message according to both the obtained data and the user record. That is to say, the register message is not restricted to only include the user record.

After step S48, the analysis apparatus 1 may selectively display the user record on the mirror screen 11, so the user may confirm the correctness of the user record (step S50). If the user determines the user record is incorrect, the analysis apparatus 1 goes back to step S46 and captures another register message through the image obtaining module 12.

Similar to the operation of the initial user, the analysis apparatus 1 detects the face record of the user through the image obtaining module 12 after step S50 (step S52), and detects the voice record of the user through the input interface 15 (such as the microphone) (step S54). Finally, the analysis apparatus 1 completes the adding action for the account of the analysis apparatus 1 according to the user record, the face record, and the voice record of the user (step S56), so as to create an new account for the user. After step S56, the analysis apparatus 1 may record at least two accounts (one of which is the initial account of the initial user).

It should be mentioned that different users may operate same electronic device 2 or different electronic devices to implement the setting method of the present invention. In particular, if different users execute the software 21 and login into the software 21 through different accounts, the user record included in the initial register message/register message generated by the software 21 will be different.

In particular, if any user needs to create a new account of the analysis apparatus 1, he or she may execute following actions to implement the adding procedures for the new account via the assistance of the electronic device 2:

(1) Downloading and installing the software 21 that corresponds to the analysis apparatus 1 in the electronic device 2;

(2) Executing the software 21 and logging into the software 21 through current exsited account data;

(3) Triggering an account adding function of the software 21, so the software 21 may emit the trigger audio, and generates and displays the register message according to the user record of the user;

(4) holding the electronic device 2 and locating the monitor of the electronic device 2 toward the image obtaining module 12 of the analysis apparatus 1, so the image obtaining module 12 is able to capture the register message displayed on the monitor of the electronic device 2.

Accordingly, the user may operate the electronic device 2 to complete all setting actions of the analysis apparatus 1, thus the buttons and the GUI of the analysis apparatus 1 may be reduced or simplified.

Figure 7:
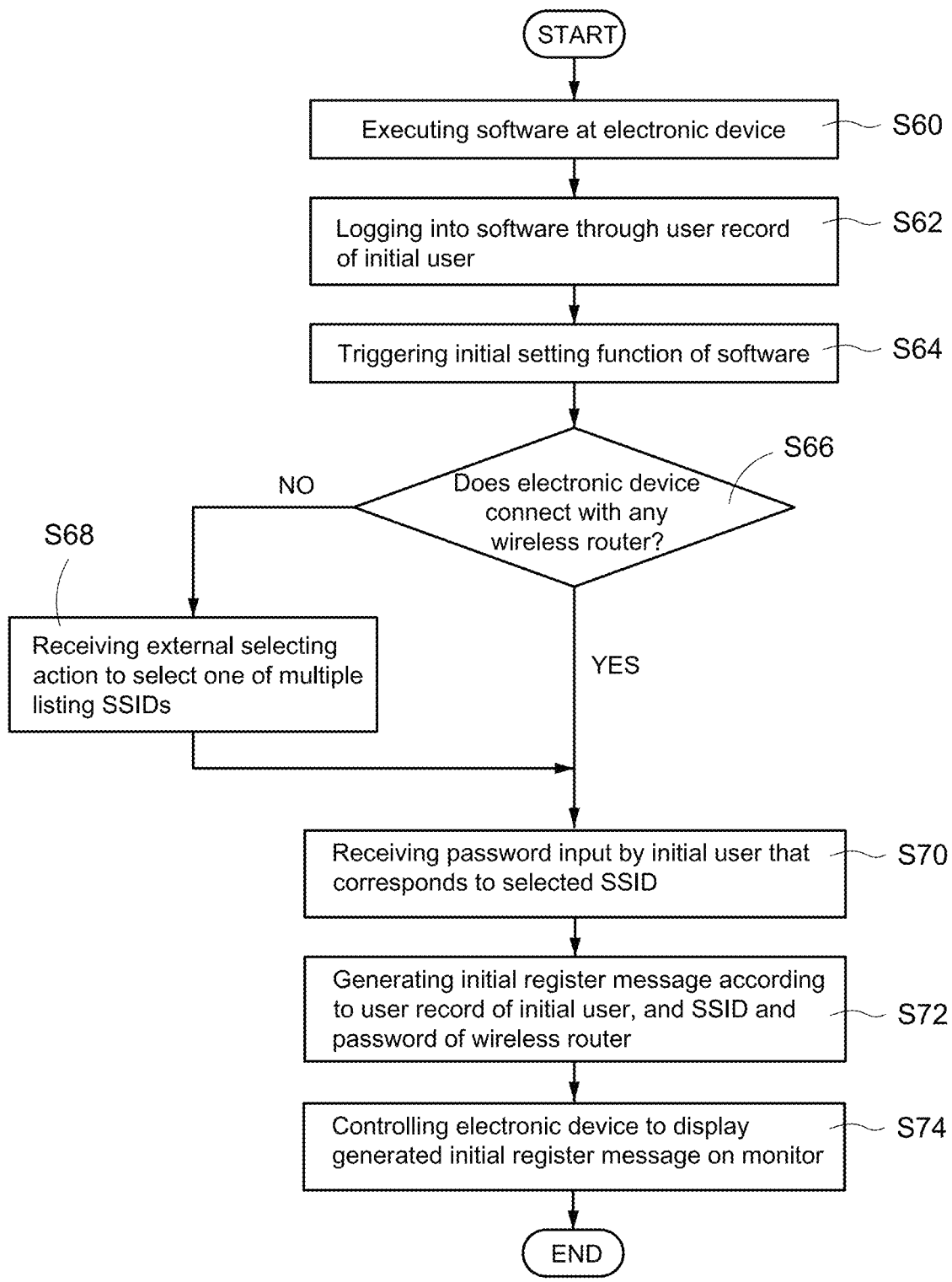
FIG. 7 is a first setting flowchart according to a second embodiment of the present invention.

FIG. 7 is a first setting flowchart according to a second embodiment of the present invention. FIG. 7 is used to describe how the initial user implements the adding procedures of the initial account through the operation of the electronic device 2.

First, the initial user executes the software 21 at the electronic device 2 (step S60), and uses the user record of the initial user to login into the software 21 (step S62). Next, the initial user may operate the electronic device 2 (for example, presses the buttons or touches the touch screen) to trigger an initial setting function of the software 21 (step S64).

After step S64, the software 21 may realize that the initial user wants to implement the initial setting actions of the analysis apparatus 1, and the software 21 determines whether the electronic device 2 is currently connected with any wireless router (step S66). If the electronic device 2 already connects to a wireless router (such as the wireless router 3), the software 21 directly obtains the SSID of the wireless router 3 from the electronic device 2.

If the electronic device 2 does not connect with any wireless router yet, the software 21 controls the electronic device 2 to perform searching and displaying a list including one or more SSIDs of one or more connectable wireless routers around the electronic device 2. Next, the software 21 may receive an external selecting action from the initial user and selects one of the SSIDs from the list according to the external selecting action (step S68).

Next, the software 21 further receives a password input by the initial user that corresponds to the selected SSID of the connecting wireless router (step S70).

Next, the software 21 generates the aforementioned initial register message according to the user record of the initial user, and the SSID and the password of the wireless router (step S72). The software 21 further controls the electronic device 2 to display the generated initial register message on its monitor (step S74), so the analysis apparatus 1 may capture the displayed initial register message through the image obtaining module 12. Therefore, the analysis apparatus 1 may capture the initial register message, implement network settings according to the content of the initial register message, and finally complete the adding procedures for creating the initial account for the initial user. In this embodiment, the initial register message may be a barcode or a QR cord, but not limited thereto.

Figure 8:
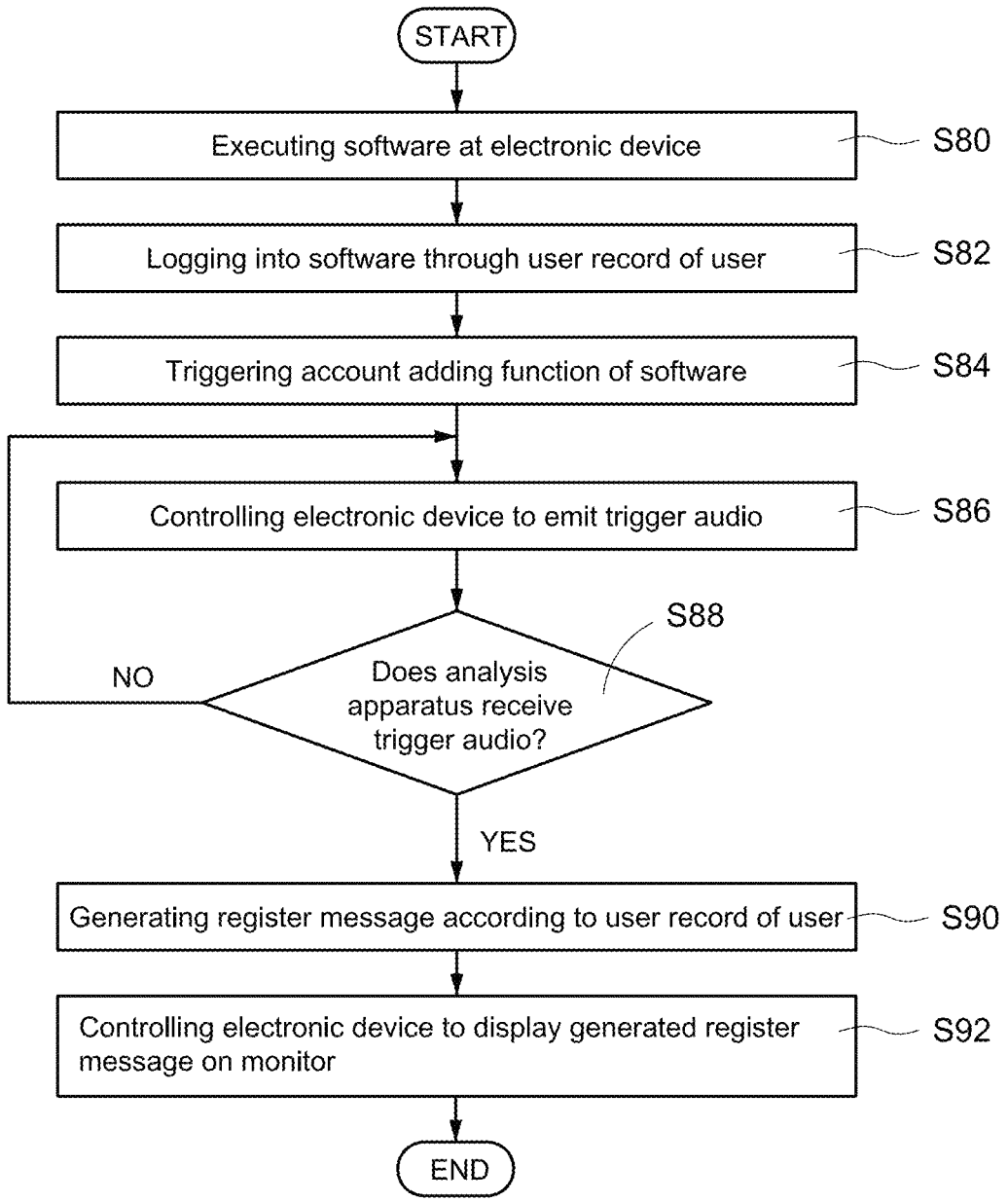
FIG. 8 is a second setting flowchart according to the second embodiment of the present invention.

FIG. 8 is a second setting flowchart according to the second embodiment of the present invention. FIG. 8 is used to describe how another user implements the adding procedures of another account through the operation of the electronic device 2.

Similar to the embodiment of FIG. 7, if a user needs to create a new account of the analysis apparatus 1, the user first executes the software 21 at the electronic device 2 (step S80), and uses the user record of the user to login into the software 21 (step S82). Next, the user further triggers an account adding function of the software 21 (step S84).

It is worth saying that the initial setting function discussed in the embodiment of FIG. 7 is to generate the initial register message according to the user record of the initial user in company with another setting data. After capturing and decoding the initial register message, the analysis apparatus 1 may create the initial account and also perform corresponding setting actions (such as network setting) according to the content of the initial register message. The account adding function in the embodiment of FIG. 8 is to generate the register message only according to the user record of the user. Therefore, after capturing and decoding the register message, the analysis apparatus 1 may only perform the adding procedures for creating a new account for the user.

After step S82, the software 21 controls the electronic device 2 to emit the aforementioned trigger audio (step S86), and receives a confirming operation from the user, so as to confirm whether the analysis apparatus 1 receives the trigger audio successfully through the input interface 15 (step S88). In particular, after the electronic device 2 emits the trigger audio, the user may check if the analysis apparatus 1 enters the aforementioned account adding mode or not, and then performs the confirming operation to the electronic device 2 according to the checking result.

After receiving the confirming operation and confirming that the analysis apparatus 1 enters the account adding mode, the software 21 may generate the register message according to the user record of the user (step S90).

Next, the software controls the electronic device 2 to display the register message on its monitor (step S92), so the analysis apparatus 1 may capture the displayed register message through the image obtaining module 12. Therefore, the analysis apparatus 1 may complete the account adding procedures after capturing the register message and creates a new account for the user according to the content of the captured register message. In the embodiment, the register message may be a barcode or a QR code, but not limited thereto.

The following description uses multiple exemplary diagrams to further introduce the scenarios of the steps shown in the aforementioned flowcharts.

Figure 9A:
FIG. 9A is a diagram showing a connection of a wireless router according to a first embodiment of the present invention.
Figure 9B:
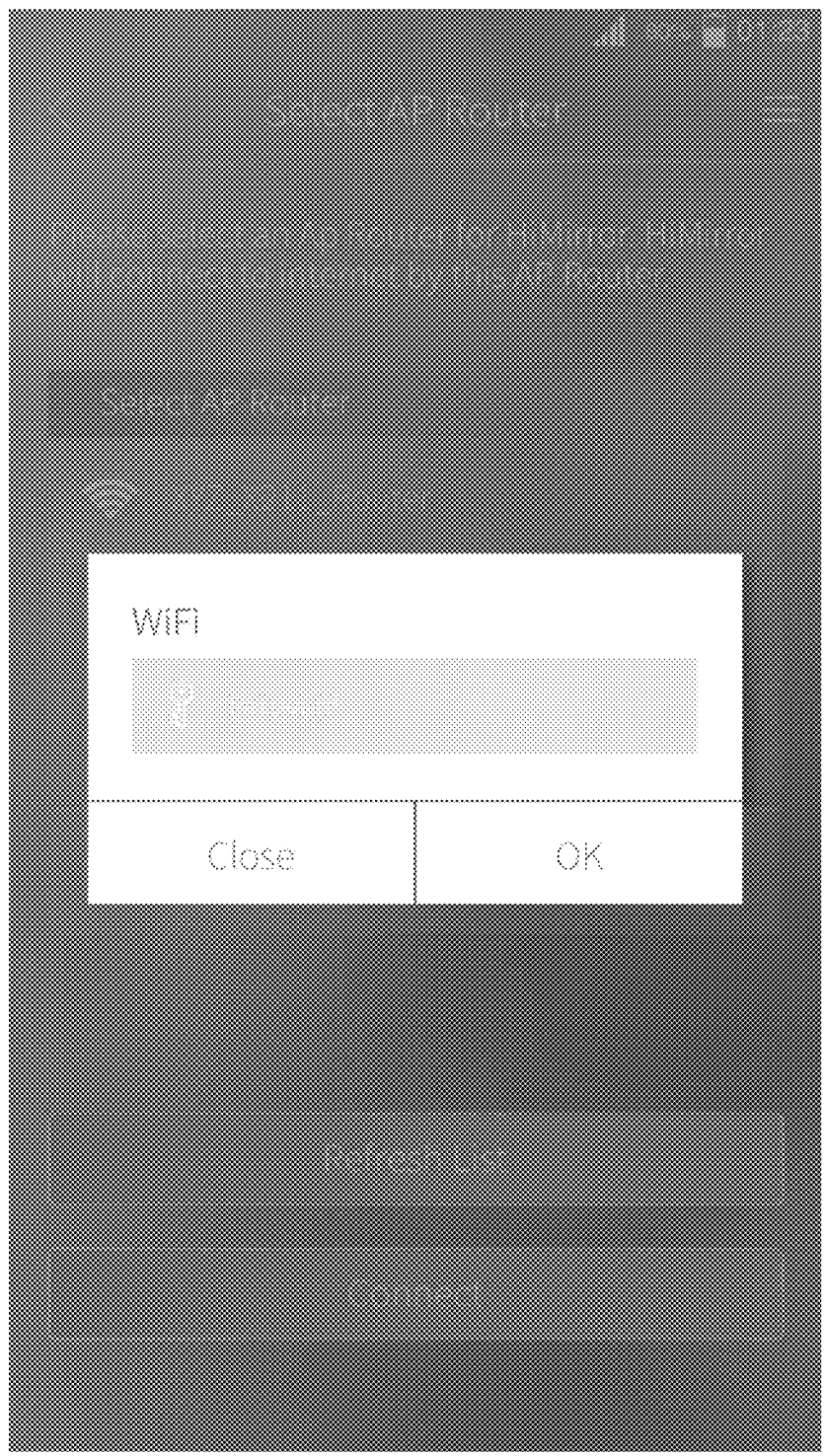
FIG. 9B is a diagram showing the connection of the wireless router according to a second embodiment of the present invention.

Refers to FIG. 9A and FIG. 9B, wherein FIG. 9A is a diagram showing a connection of a wireless router according to a first embodiment of the present invention, and FIG. 9B is a diagram showing the connection of the wireless router according to a second embodiment of the present invention.

After the initial user triggers the initial setting function of the software 21 in step S64 of FIG. 7, the software 21 may determine whether the electronic device 2 is already connect with any wireless router. If the electronic device 2 does not connect with any wireless router yet, the software 21 may controls the electronic device 2 to display the image as shown in FIG. 9A, so as to require the initial user to select one SSID that corresponds to a wireless router from multiple listing SSIDs that correspond to a plurality of wireless routers around the electronic device 2.

On the other hands, the software 21 may not able to catch the password of the selected wireless router right from the electronic device 2 due to security issues, so the software 21 may controls the electronic device 2 to display the image as shown in FIG. 9B after the initial user selects one of the multiple listing SSIDs, so as to require the initial user to input the password corresponding to the selected SSID. Therefore, the electronic device 2 may connect to the selected wireless router corresponding to the selected SSID, and generates the initial register message according to the data related to the initial user record and the connected wireless router (such as the SSID and the password).

Figure 10:
FIG. 10 is a diagram showing a QR code according to a first embodiment of the present invention.

FIG. 10 is a diagram showing a QR code according to a first embodiment of the present invention. If the initial user triggers the initial setting function of the software 21 in step S64 of FIG. 7, or another user triggers the account adding function of the software 21 in step S84 of FIG. 8, the software 21 may generate the initial register message/register message according to the initial user record/user record (or the initial user record/user record in company with the SSID and the password).

After the initial register message or the register message is generated, the software 21 may control the electronic device 2 to display the initial register message or the register message on its monitor as shown in FIG. 10, so as to provide the initial register message or the register message for being captured by the image obtaining module 12 of the analysis apparatus 1. In the embodiment shown in FIG. 10, the initial register message/register message is depicted as a QR code, but not limited thereto.

Figure 11:
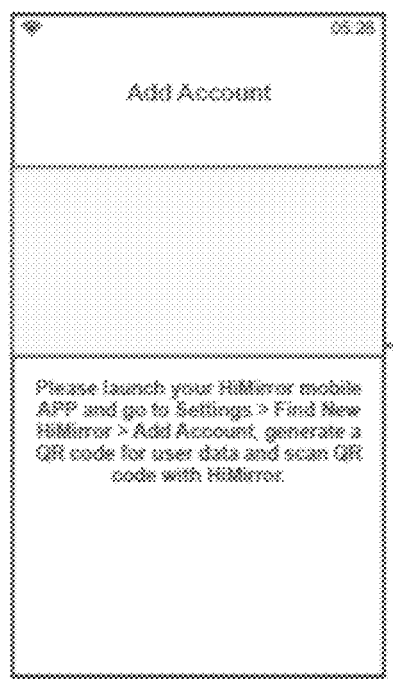
FIG. 11 is a diagram of waiting for scan according to a first embodiment of the present invention.

FIG. 11 is a diagram of waiting for scan according to a first embodiment of the present invention. After entering the account adding mode in step S16 of FIG. 5 or in step S44 of FIG. 6, the analysis apparatus 1 activates the image obtaining module 12 to scan, and displays the image as shown in FIG. 11 on the mirror screen 11. In particular, the image shown in FIG. 11 is used to indicate an operating guidance, so as to teach the initial user/another user how to operate the electronic device 2 for it to generate and display the initial register message/register message.

Figure 12:
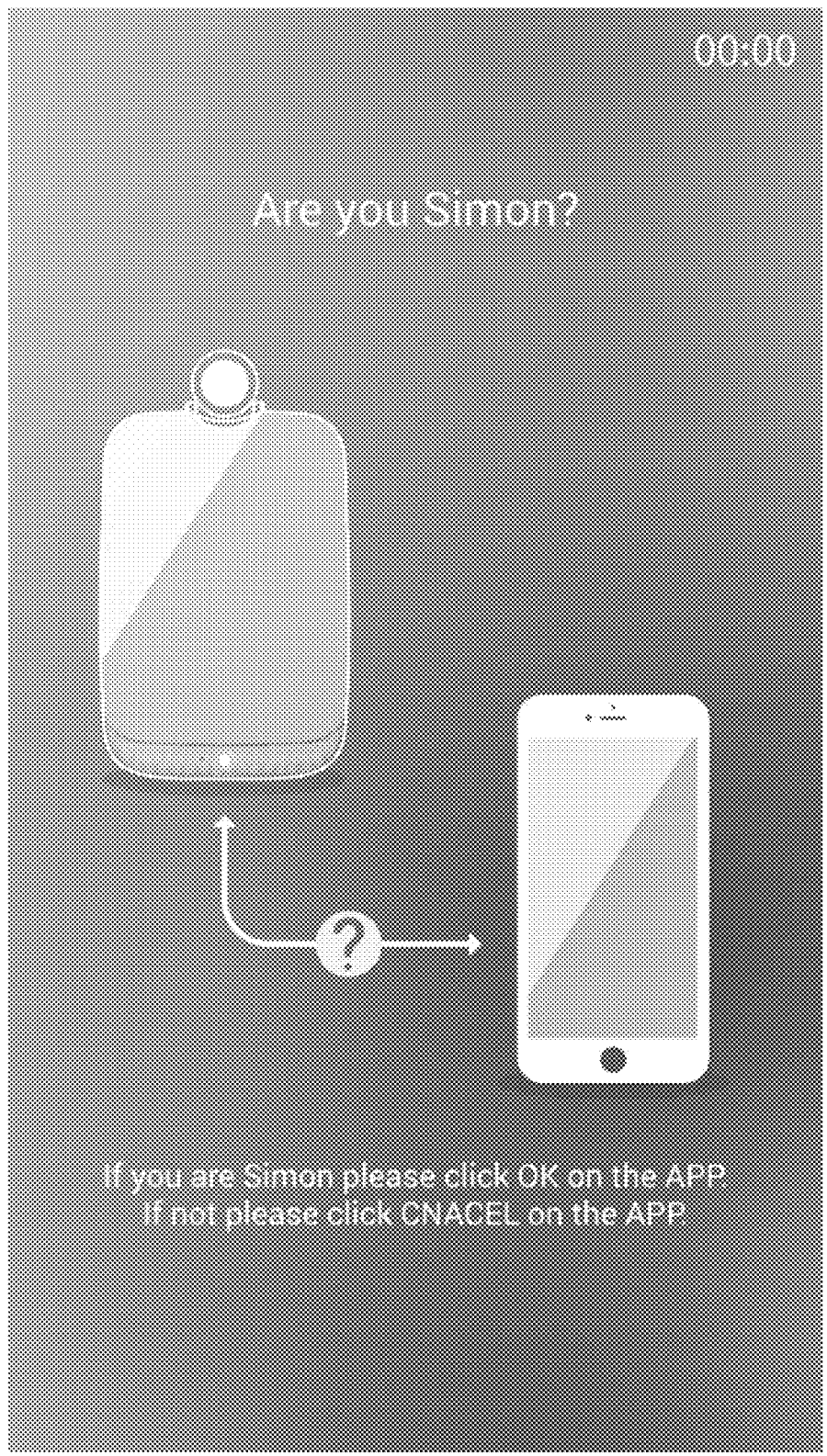
FIG. 12 is a diagram of identity confirmation according to a first embodiment of the present invention.

FIG. 12 is a diagram of identity confirmation according to a first embodiment of the present invention. After decoding the initial register message/register message and obtaining corresponding initial user record/user record in step S20 of FIG. 5 or in step S48 of FIG. 6, the analysis apparatus 1 may display the image as shown in FIG. 12. In particular, the analysis apparatus 1 in FIG. 12 is to display the obtained initial user record/user record on the mirror screen 11, so the initial user/another user may confirm whether the initial user record/user record is correct or not.

Figure 13A:
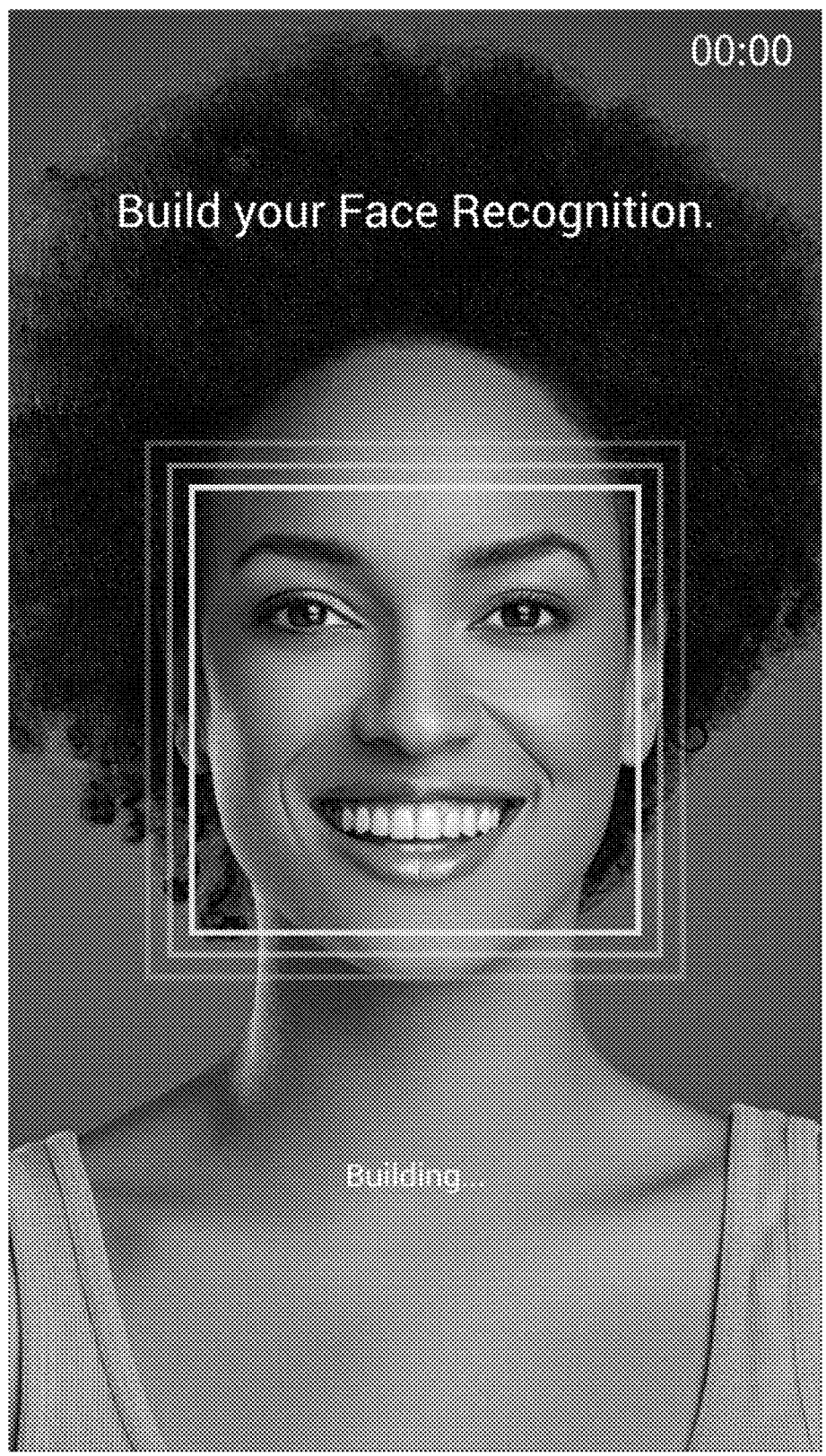
FIG. 13A is a diagram of face recognition according to a first embodiment of the present invention.
Figure 13B:
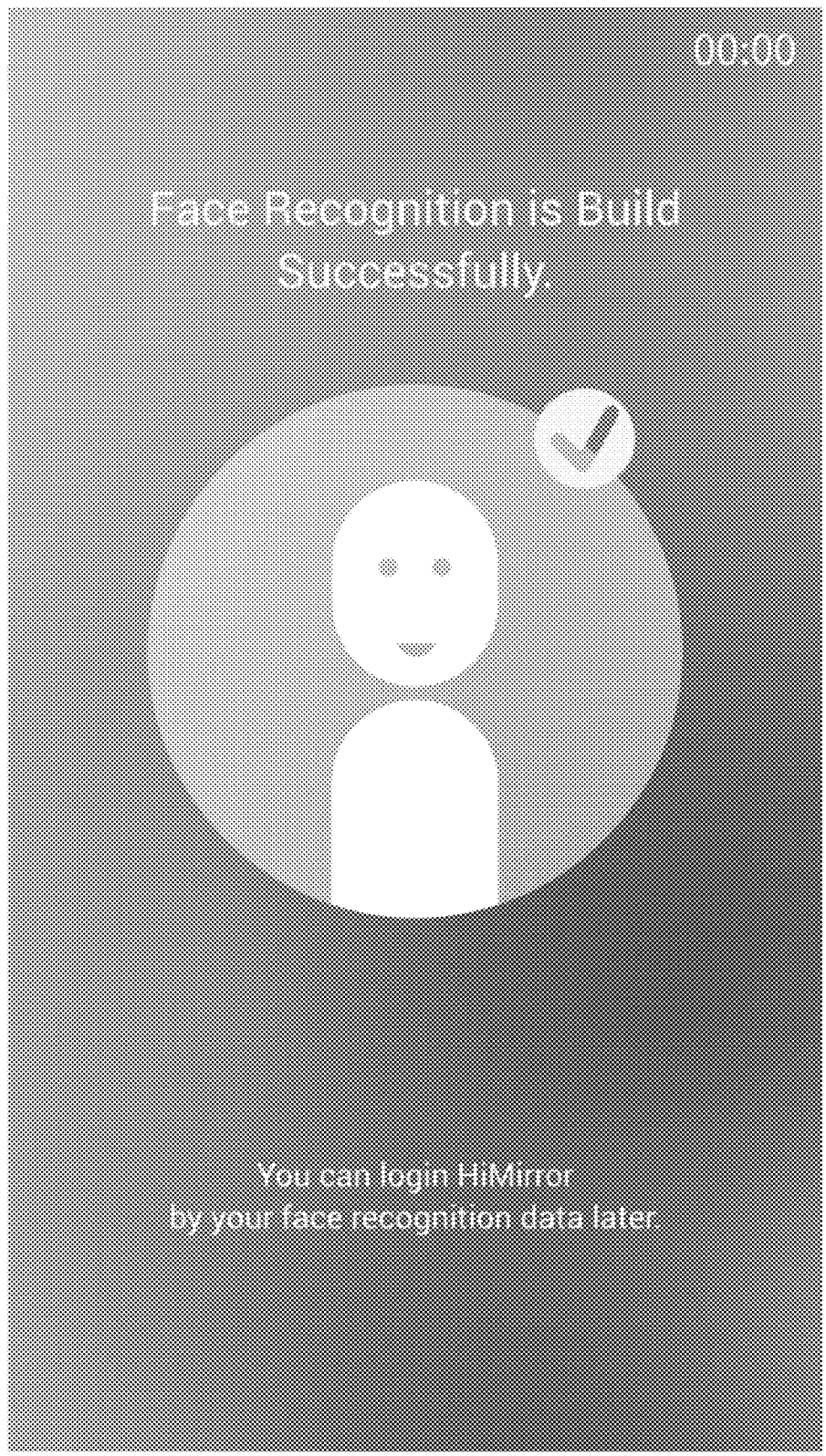
FIG. 13B is a diagram of face recognition according to a second embodiment of the present invention.

Refers to FIG. 13A and FIG. 13B, wherein FIG. 13A is a diagram of face recognition according to a first embodiment of the present invention, and FIG. 13B is a diagram of face recognition according to a second embodiment of the present invention. After confirming the initial user record/user record is correct in step S22 of FIG. 5 or in step S50 of FIG. 6, the analysis apparatus 1 may activate the image obtaining module 12 to capture and to store the face record of the initial user/another user. While capturing the face record, the analysis apparatus 1 may display the image as shown in FIG. 13A on the mirror screen 11, so as to inform the initial user/another user about the execution of capturing and storing the face record.

After the face record is captured completely, the analysis apparatus 1 may further display the image as shown in FIG. 13B on the mirror screen 11, so as to inform the initial user/another user about the completion of capturing and storing the face record.

Figure 14A:
FIG. 14A is a diagram of voice recognition according to a first embodiment of the present invention.
Figure 14B:
FIG. 14B is a diagram of voice recognition according to a second embodiment of the present invention.
Figure 14C:
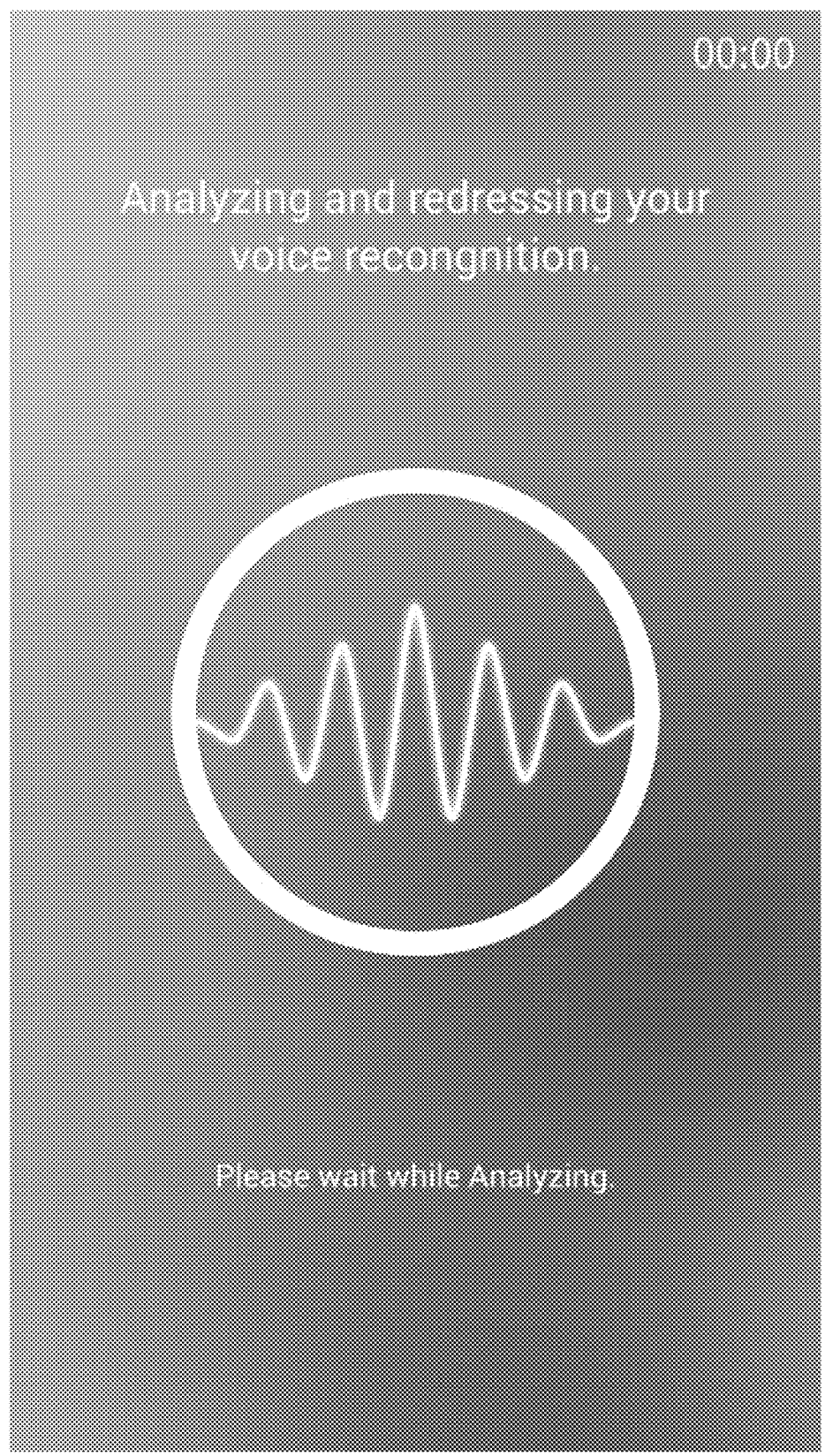
FIG. 14C is a diagram of voice recognition according to a third embodiment of the present invention.
Figure 14D:
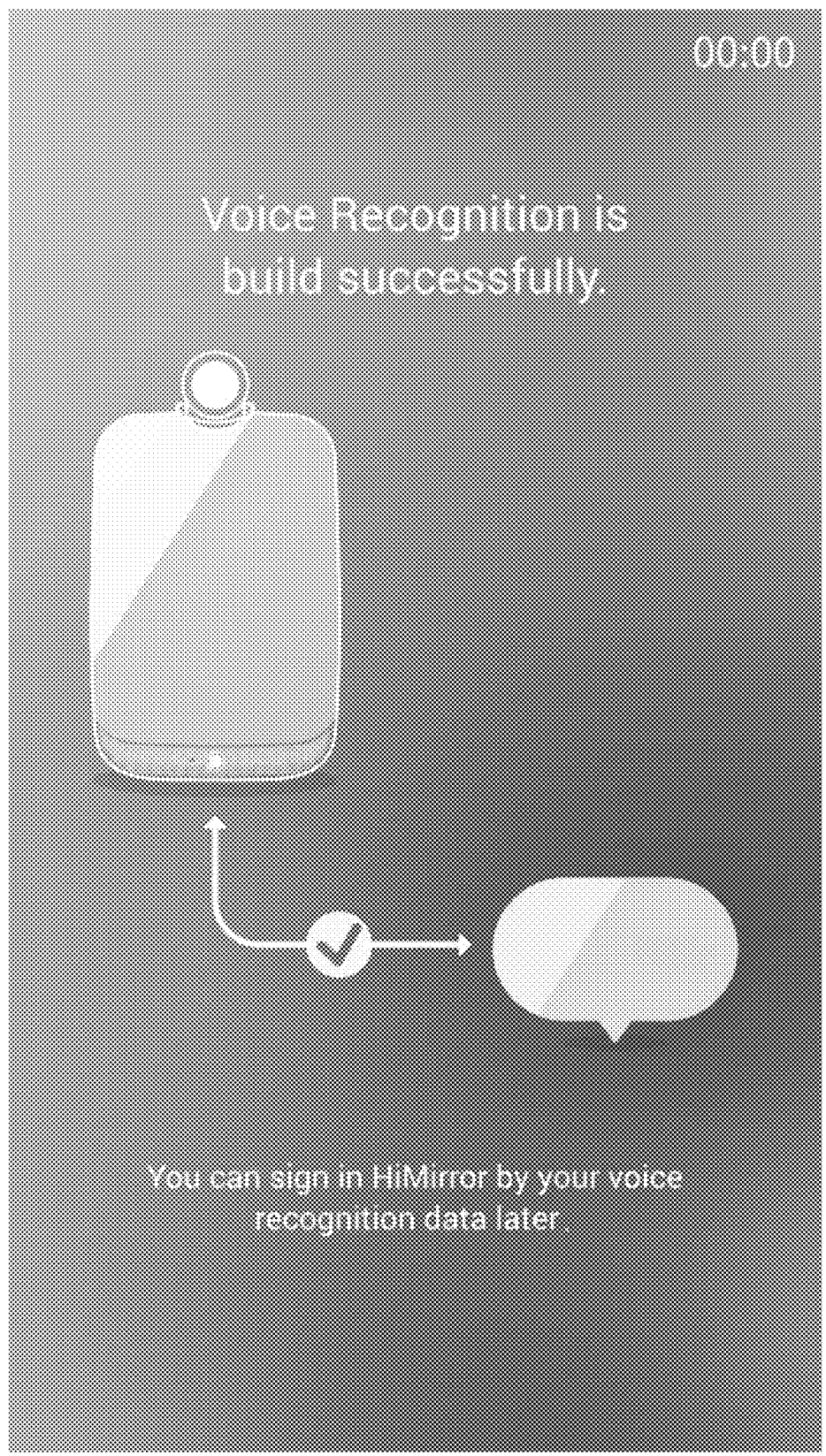
FIG. 14D is a diagram of voice recognition according to a fourth embodiment of the present invention.

Refers to FIG. 14A to FIG. 14D, wherein FIG. 14A is a diagram of voice recognition according to a first embodiment of the present invention, FIG. 14B is a diagram of voice recognition according to a second embodiment of the present invention, FIG. 14C is a diagram of voice recognition according to a third embodiment of the present invention, and FIG. 14D is a diagram of voice recognition according to a fourth embodiment of the present invention.

After confirming the user record is correct in step S22 of FIG. 5 or in step S50 of FIG. 6, the analysis apparatus 1 may activate the input interface 15 to capture, recognize and store the voice record of the initial user/another user. While capturing the voice record, the analysis apparatus 1 may display the images as shown in FIG. 14A, FIG. 14B, and FIG. 14C on the mirror screen 11, so as to inform the initial user/another user about the execution of capturing, recognizing, and sorting the voice record.

In particular, the analysis apparatus 1 in the present invention allows the initial user/another user to execute corresponding actions through voice commands, so the initial user/another is allowed to establish one or more voice commands in the analysis apparatus 1. In the image shown in FIG. 14A, the analysis apparatus 1 is indicating the initial user/another user to emit a first voice (for example, "HiMirror Listen" as shown in FIG. 14A). After the first voice is established successfully, the initial user/another user may activate the analysis apparatus 1 through a first voice command corresponding to the first voice (i.e., the user may say "HiMirror Listen" to the analysis apparatus 1 to activate the analysis apparatus 1).

In the image shown in FIG. 14B, the analysis apparatus 1 is indicating the initial user/another user to emit a second voice (for example, "Bye Mirror" as shown in FIG. 14B). After the second voice is established successfully, the initial user/another user may turn off the analysis apparatus 1 or lead the analysis apparatus 1 entering a standby mode though a second voice command corresponding to the second voice (i.e., the user may say "Bye Mirror" to the analysis apparatus 1 to turn off the analysis apparatus 1, or to lead the analysis apparatus 1 entering the standby mode).

In the image shown in FIG. 14C, the analysis apparatus 11 is displaying a notice message to inform the initial user/another user about the execution of recognizing the emitted voice, and requires the initial user/another user to wait for a while to prevent the initial user/another user from causing any wrong action. After finishing recognizing and storing the captured voice, the analysis apparatus 1 may display the image as shown in FIG. 14D, so as to inform the initial user/another user about the completion of recognizing and storing the voice record of the initial user/another user.

Figure 15:
FIG. 15 is a diagram of setting completed according to a first embodiment of the present invention.

FIG. 15 is a diagram of setting completed according to a first embodiment of the present invention. After finishing the adding procedures of the initial account/another account in step S30 of FIG. 5 or in step S56 of FIG. 6, the analysis apparatus 1 may display the image as shown in FIG. 15, so as to inform the initial user/another user about the completion of creating the initial account/another account, and then the initial user/another user may start to use the analysis apparatus 1 to analyze and record his/her body information.

By using the setting method of each exemplary embodiment of the present invention, a user is allowed to operate the electronic device 2 to implement the account adding procedures, the network setting actions, and further setting actions for setting another data of the analysis apparatus 1, which is very convenience.

As the skilled person will appreciate, various changes and modifications can be made to the described embodiment. It is intended to include all such variations, modifications and equivalents which fall within the scope of the present invention, as defined in the accompanying claims.

What is claimed is:

1. A data setting method for body information analysis apparatus, adopted by a body information analysis apparatus (1) and comprising following steps:

a) determining whether an input interface (15) of the body information analysis apparatus (1) receives a trigger audio emitted from an electronic device (2);
b) controlling the body information analysis apparatus (1) to enter an account adding mode to wait after receiving the trigger audio, and activating an image obtaining module (12) of the body information analysis apparatus (1) in the account adding mode;
c) determining, in the account adding mode, whether the image obtaining module (12) captures a register message displayed by the electronic device (2), wherein the register message is generated according to a user record corresponding to a user of the electronic device (2);
d) decoding the register message for obtaining the user record therein after capturing the register message;
e) detecting a face record of the user through the image obtaining module (12);
f) detecting a voice record of the user through the input interface (15); and
g) creating an account for the user of the body information analysis apparatus (1) according to the user record, the face record and the voice record.

2. The data setting method for body information analysis apparatus in claim 1, wherein the register message is a QR code, and the electronic device (2) displays the register message through a monitor for being captured by the image obtaining module (12).

3. The data setting method for body information analysis apparatus in claim 1, wherein the electronic device (2) is installed with software (21), and the user record is an account data used by the user for registering an account of the software (21).

4. The data setting method for body information analysis apparatus in claim 3, further comprising following steps:
h1) receiving an external operation for confirming whether the user record is correct after step d); and
h2) executing step e) to step g) after confirming the user record is correct through the external operation.

5. The data setting method for body information analysis apparatus in claim 3, further comprising following steps before step a):
a01) turning on the body information analysis apparatus (1);
a02) controlling the body information analysis apparatus (1) to enter the account adding mode to wait after the body information analysis apparatus (1) is turned on;
a03) determining, in the account adding mode, whether the image obtaining module (12) captures an initial register message displayed by the electronic device (2);
a04) decoding the initial register message for obtaining an initial user record of an initial user from the decoded initial register message after capturing the initial register message;
a05) detecting a face record of the initial user through the image obtaining module (12);
a06) detecting a voice record of the initial user through the input interface (15); and
a07) creating an initial account for the initial user of the body information analysis apparatus (1) according to the initial user record, the face record and the voice record of the initial user, and then executing step a.

6. The data setting method for body information analysis apparatus in claim 5, wherein the initial register message comprises account data used by the initial user for registering an account of the software (21), and a service set ID (SSID) and a password of a wireless router (3) connected with the electronic device (2), wherein step a04) is to decode the initial register message for simultaneously obtaining the initial user record, the SSID and the password from the decoded initial register message.

7. The data setting method for body information analysis apparatus in claim 6, further comprising following step:
a08) controlling the body information analysis apparatus (1) to connect to the wireless router (3) through the obtained SSID and the obtained password after step a04).

8. The data setting method for body information analysis apparatus in claim 5, further comprising following step:
a09) displaying a greeting video through a display module (111) of the body information analysis apparatus (1) after step a01).

9. The data setting method for body information analysis apparatus in claim 5, further comprising following steps:
a10) after step a01), determining whether the body information analysis apparatus (1) records any account therein.
a11) executing step a02) if no account is recorded in the body information analysis apparatus (1); and
a12) executing step a) if at least one account is already recorded in the body information analysis apparatus (1).

10. The data setting method for body information analysis apparatus in claim 5, further comprising following steps before step a03):
k1) executing the software (21) at the electronic device (2) and logging into the software (21) by the initial user record;
k2) receiving an external operation for triggering an initial setting function of the software (21);
k3) generating the initial register message according to the initial user record of the initial user by the software (21) after the initial setting function is triggered; and
k4) controlling the electronic device (2) to display the generated initial register message on a monitor.

11. The data setting method for body information analysis apparatus in claim 10, wherein step k3) is to generate the initial register message according to the initial user record in company with a SSID and a password of a wireless router (3) connected with the electronic device (2).

12. The data setting method for body information analysis apparatus in claim 11, further comprising following steps:
k5) determining whether the electronic device (2) is connected to any wireless router (3) by the software (21) after step k2);
k6) receiving an external selecting action for selecting one of a plurality of SSIDs if the electronic device (2) is not connected with any wireless router (3) yet; and
k7) receiving the password corresponding to the selected SSID and then executing step k3).

13. The data setting method for body information analysis apparatus in claim 3, further comprising following steps before step b):
i1) executing the software (21) at the electronic device (2) and logging into the software (21) by the user record;
i2) receiving an external operation for triggering an account adding function of the software (21); and
i3) controlling the electronic device (2) to emit the trigger audio after the account adding function is triggered.

14. The data setting method for body information analysis apparatus in claim 13, further comprising following steps before step c):
j1) generating the register message according to the user record of the user by the software (21); and j2) controlling the electronic device (2) to display the generated register message on a monitor.

\* \* \* \* \*